United States Patent
Mahoney et al.

(10) Patent No.: US 10,597,254 B2
(45) Date of Patent: Mar. 24, 2020

(54) AUTOMATED CONVEYANCE SYSTEM MAINTENANCE

(71) Applicant: Otis Elevator Company, Farmington, CT (US)

(72) Inventors: Sally Day Mahoney, New Hartford, CT (US); Sandeep Sudi, Unionville, CT (US); Frank Higgins, Burlington, CT (US); Yosef Haimes, West Hartford, CT (US); Mick Maurer, Burlington, CT (US); Tony Black, Hobe Sound, FL (US); Leslie C. Watterson, Unionville, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 118 days.

(21) Appl. No.: 15/473,971

(22) Filed: Mar. 30, 2017

(65) Prior Publication Data

US 2018/0282112 A1    Oct. 4, 2018

(51) Int. Cl.
*B66B 1/34* (2006.01)
*B66B 5/00* (2006.01)
*G06Q 10/10* (2012.01)
*G06Q 10/06* (2012.01)
*G06Q 10/00* (2012.01)

(52) U.S. Cl.
CPC .......... *B66B 1/3461* (2013.01); *B66B 5/0025* (2013.01); *G06Q 10/0631* (2013.01); *G06Q 10/1093* (2013.01); *G06Q 10/20* (2013.01)

(58) Field of Classification Search
CPC ............................ B66B 1/3461; B66B 5/0025

USPC .......................................................... 187/393
See application file for complete search history.

(56) References Cited

U.S. PATENT DOCUMENTS

| | | | |
|---|---|---|---|
| 3,409,877 A | 11/1968 | Alterman et al. | |
| 4,458,788 A | 7/1984 | Lepore | |
| 4,512,442 A | 4/1985 | Moore et al. | |
| 4,771,865 A | 9/1988 | Hinderling | |
| 5,787,020 A | 7/1998 | Molliere et al. | |
| 6,101,433 A | 8/2000 | Flicker, Jr. | |
| 6,217,076 B1 * | 4/2001 | Howard | B42D 5/04 283/2 |
| 6,330,935 B1 * | 12/2001 | Systermans | B66B 5/0025 187/391 |
| 6,516,923 B2 | 2/2003 | Lence Barreiro et al. | |
| 6,604,611 B2 | 8/2003 | Liu et al. | |

(Continued)

FOREIGN PATENT DOCUMENTS

| CN | 202785224 U | 3/2013 |
|---|---|---|
| CN | 203095330 U | 7/2013 |

(Continued)

OTHER PUBLICATIONS

European Search Report for application EP 18164236.4, dated Jun. 1, 2018, 8 pages.

*Primary Examiner* — Jeffrey Donels
(74) *Attorney, Agent, or Firm* — Cantor Colburn LLP (57) ABSTRACT

A method for automating maintenance of a conveyance system includes performing automated maintenance tasks on the conveyance system; storing results of the automated maintenance tasks in a maintenance database; and providing maintenance tasks to the mobile device, each maintenance task including a maintenance task identifier and a maintenance task status.

20 Claims, 5 Drawing Sheets

(56) References Cited

U.S. PATENT DOCUMENTS

| | | | |
|---|---|---|---|
| 6,863,161 B2 | 3/2005 | Mearns et al. | |
| 7,003,434 B2 | 2/2006 | Azpitarte | |
| 7,004,289 B2 | 2/2006 | Shrum, III et al. | |
| 7,073,633 B2 * | 7/2006 | Weinberger | B66B 5/0025 |
| | | | 187/247 |
| 7,172,055 B2 | 2/2007 | Engel et al. | |
| 7,344,004 B2 | 3/2008 | Engel et al. | |
| 7,503,435 B2 | 3/2009 | Tyni et al. | |
| 7,699,142 B1 | 4/2010 | Wurth et al. | |
| 7,721,852 B2 | 5/2010 | Ishioka et al. | |
| 8,028,807 B2 * | 10/2011 | Deplazes | B66B 5/0025 |
| | | | 187/247 |
| 8,069,958 B2 | 12/2011 | Lence-Barreiro | |
| 8,540,057 B2 | 9/2013 | Schuster et al. | |
| 8,678,143 B2 | 3/2014 | Bunter | |
| 9,580,276 B2 * | 2/2017 | Toutaoui | B66B 1/3461 |
| 2002/0138327 A1 | 9/2002 | Mello et al. | |
| 2003/0217894 A1 | 11/2003 | Perala et al. | |
| 2004/0193518 A1 | 9/2004 | Deplazes | |
| 2014/0039838 A1 | 2/2014 | Katz Luis Alberto et al. | |
| 2014/0267296 A1 | 9/2014 | Neeley et al. | |
| 2015/0284214 A1 * | 10/2015 | Park | B66B 5/0018 |
| | | | 187/393 |
| 2016/0171455 A1 | 6/2016 | Eleid et al. | |
| 2016/0185569 A1 | 6/2016 | Sonnenmoser et al. | |
| 2016/0376124 A1 | 12/2016 | Bunter et al. | |
| 2017/0022028 A1 | 1/2017 | Cortona et al. | |
| 2017/0029244 A1 | 2/2017 | Madarasz et al. | |
| 2018/0141780 A1 * | 5/2018 | Franck | B66B 3/00 |
| 2018/0150806 A1 * | 5/2018 | Eleid | B66B 25/006 |
| 2018/0247278 A1 * | 8/2018 | Winz | G06T 7/0004 |

FOREIGN PATENT DOCUMENTS

| | | |
|---|---|---|
| CN | 103248873 A | 8/2013 |
| CN | 103449267 A | 12/2013 |
| CN | 203439860 U | 2/2014 |
| CN | 102070054 A | 10/2014 |
| CN | 104071662 A | 10/2014 |
| CN | 105645211 A | 6/2016 |
| CN | 105731209 A | 7/2016 |
| CN | 106081848 A | 11/2016 |
| CN | 106408092 A | 2/2017 |
| EP | 1464605 A1 | 10/2004 |
| EP | 2336070 A1 | 6/2011 |
| JP | 2007031082 A | 2/2007 |
| KR | 20130009308 A | 1/2013 |
| WO | 2015125066 A1 | 8/2015 |
| WO | 2017037240 A1 | 3/2017 |

\* cited by examiner

AUTOMATED CONVEYANCE SYSTEM MAINTENANCE

TECHNICAL FIELD

The subject matter disclosed herein generally relates to conveyance system maintenance, and more specifically, to a system that facilitates conveyance system maintenance through interaction with a mobile device.

DESCRIPTION OF RELATED ART

Elevator and escalator service providers typically develop maintenance routines per unit based on code required tests and vendor specified maintenance tasks. The maintenance tasks and frequency are based on items such as equipment type, usage and current condition. Currently, elevator and escalator maintenance mechanics perform the maintenance routines as scheduled for the particular visit. The mechanic performs the check when visiting the building, giving a view of the performance or state of the system on the day of the visit. In some cases there may be variations in the way that the maintenance task is performed between difference mechanics. It is desired to provide both consistency in the execution of maintenance tasks across all mechanics, and provide a summary of the performance across time rather than just on the day of visit.

SUMMARY

According to one embodiment, a method for automating maintenance of a conveyance system includes performing automated maintenance tasks on the conveyance system; storing results of the automated maintenance tasks in a maintenance database; and providing maintenance tasks to the mobile device, each maintenance task including a maintenance task identifier and a maintenance task status.

In addition to one or more of the features described above, or as an alternative, further embodiments may include receiving from the mobile device an indication of completion of a maintenance task; and updating the maintenance database to include completion of the maintenance task.

In addition to one or more of the features described above, or as an alternative, further embodiments may include wherein the maintenance task identifier includes automated maintenance tasks and manual maintenance tasks.

In addition to one or more of the features described above, or as an alternative, further embodiments may include wherein the maintenance tasks status includes completed and uncompleted.

In addition to one or more of the features described above, or as an alternative, further embodiments may include wherein the maintenance tasks provided to the mobile device include at least one of maintenance tasks required by local regulations and maintenance tasks specified by the conveyance system manufacturer.

In addition to one or more of the features described above, or as an alternative, further embodiments may include receiving sensor data from one or more sensors associated with the conveyance system; wherein the maintenance tasks provided to the mobile device include event-driven maintenance tasks derived from the sensor data.

In addition to one or more of the features described above, or as an alternative, further embodiments may include wherein the maintenance task status provides a graphical indication of whether a maintenance task is completed or uncompleted.

In addition to one or more of the features described above, or as an alternative, further embodiments may include wherein the maintenance tasks are provided to the mobile device by a conveyance system controller or by a remote device hosting the maintenance database.

In addition to one or more of the features described above, or as an alternative, further embodiments may include wherein the providing the maintenance tasks to the mobile device is in response to at least one of a request from the mobile device, a push operation to the mobile device or a maintenance calendar event.

In addition to one or more of the features described above, or as an alternative, further embodiments may include wherein the providing the maintenance tasks to the mobile device is in response to a condition detected in the conveyance system.

In addition to one or more of the features described above, or as an alternative, further embodiments may include wherein the performing the automated maintenance tasks comprises performing the automated maintenance tasks periodically.

In addition to one or more of the features described above, or as an alternative, further embodiments may include wherein the performing the automated maintenance tasks comprises collecting and aggregating data from the conveyance system and performing the automated maintenance tasks in response to the data.

In addition to one or more of the features described above, or as an alternative, further embodiments may include receiving video from a camera associated with the conveyance system; wherein the performing the automated maintenance tasks comprises performing video analytics on the video and performing the automated maintenance tasks in response to the video analytics.

According to another embodiment, a computer program product for a mobile device includes a computer readable storage medium having program instructions embodied therewith, the program instructions executable by a processor to cause the processor to implement operations comprising: establishing a connection with a maintenance database, the maintenance database storing results of automated maintenance tasks for a conveyance system; receiving maintenance tasks from the maintenance database, each maintenance task including a maintenance task identifier and a maintenance task status; upon completion of a maintenance task, transmitting completion of the maintenance task to update the maintenance database to indicate completion of the maintenance task.

In addition to one or more of the features described above, or as an alternative, further embodiments may include wherein the maintenance task identifier includes automated maintenance tasks and manual maintenance tasks.

In addition to one or more of the features described above, or as an alternative, further embodiments may include wherein the maintenance tasks status includes completed and uncompleted.

In addition to one or more of the features described above, or as an alternative, further embodiments may include wherein the maintenance tasks provided to the mobile device include at least one of maintenance tasks required by local regulations and maintenance tasks specified by the conveyance system manufacturer.

In addition to one or more of the features described above, or as an alternative, further embodiments may include wherein the maintenance tasks include event-driven maintenance tasks derived from sensor data.

In addition to one or more of the features described above, or as an alternative, further embodiments may include wherein the maintenance task status provides a graphical indication of whether a maintenance task is completed or uncompleted.

In addition to one or more of the features described above, or as an alternative, further embodiments may include wherein the maintenance tasks are received from a conveyance system controller or a remote device hosting the maintenance database.

Technical effects of embodiments include the ability to provide maintenance tasks and maintenance task status a mobile device. Maintenance tasks may be completed automatically by the system, thereby reducing workload on the user.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

Figure 1:
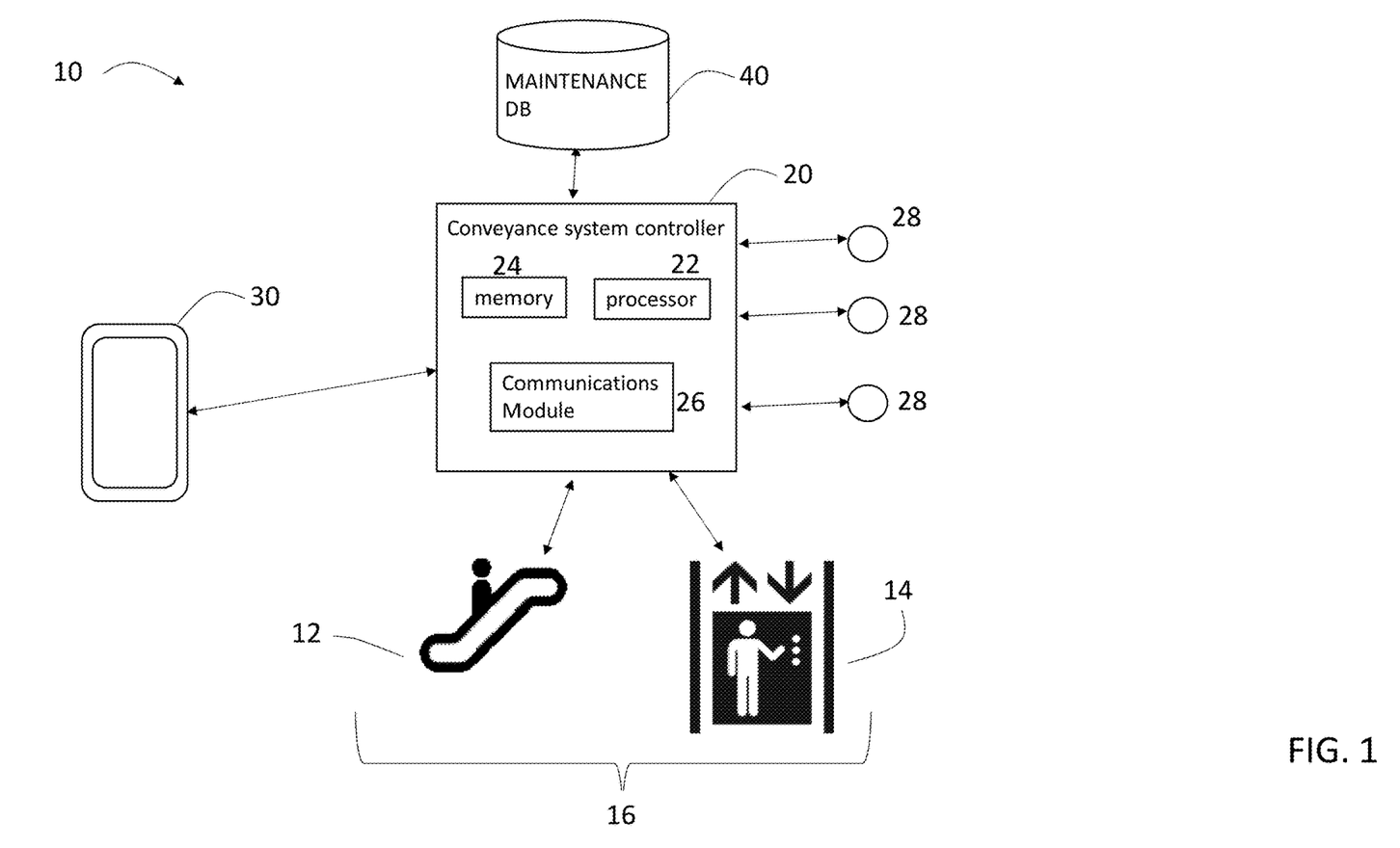
FIG. 1 depicts a system for automating conveyance system maintenance in an embodiment.

FIG. 1 depicts a system 10 in accordance with one or more embodiments. The system 10 may include one or more conveyance systems such as one or more escalators 12 and/or one or more elevators 14, referred to generally as a conveyance system 16. It is understood that other types of conveyance systems may be used in embodiments (e.g., moving walkways) and embodiments are not limited to the conveyance systems of FIG. 1. A conveyance system controller 20 is used to control operation of the conveyance system 16 using known techniques. For example, for elevator 14 the conveyance system controller 20 would receive calls for elevator cars and direct elevator cars to serve the various calls.

The conveyance system controller 20 may include a processor 22, a memory 24, and communication module 26 as shown in FIG. 1. The processor 22 can be any type or combination of computer processors, such as a microprocessor, microcontroller, digital signal processor, application specific integrated circuit, programmable logic device, and/or field programmable gate array. The memory 24 is an example of a non-transitory computer readable storage medium tangibly embodied in the conveyance system controller 20 including executable instructions stored therein, for instance, as firmware. The communication module 26 may implement one or more communication protocols as described in further detail herein.

The conveyance system controller 20 is coupled to one or more sensors 28. Sensors 28 may include a variety of different types of sensors. One or more sensors 28 may be incorporated into the conveyance system 16 and measure location, speed, voltage/current, vibration, temperature, force, stress, dimensions, etc. of components of the conveyance system 16. Other sensors 28 may include cameras, people counters, microphones, etc. to capture information relevant to the usage of the conveyance system 16. Thus, the type and nature of sensors 28 is not limited to the embodiments disclosed herein.

The conveyance system controller 20 interfaces with a maintenance database 40 stored on a memory device. Maintenance database 40 may be part of the conveyance system controller 20, part of a building system or network, or remote memory accessed via a network. The conveyance system controller 20 communicates/interfaces with the maintenance database 40 to maintain a list of maintenance tasks and a corresponding maintenance task status. The maintenance tasks may include a variety of maintenance items including maintenance tasks required by local or regional regulations or codes. Examples of code required tasks include items such as checking the traction machine for abnormal noise or vibration, checking that the cab emergency lighting is functional and checking that the door reversal devices are functioning as required by code. The maintenance tasks may also include items provided by the manufacturer of the conveyance system, whether required by local regulations or not. Examples of manufacturer required tasks include checking that the machine room temperature is within the specification of the equipment type, checking and cleaning fans installed in cabinets and checking conveyance system internal logs. The maintenance tasks may also include a schedule that identifies how often a maintenance task is to be performed. If a maintenance task requires a measurement, the maintenance task may also include an acceptable measured value, or acceptable range of measured values. For example, a maintenance task may indicate that the door clearance for an elevator door be checked twice a year and the measured door clearance should be within 5 mm to 10 mm.

Figure 2:
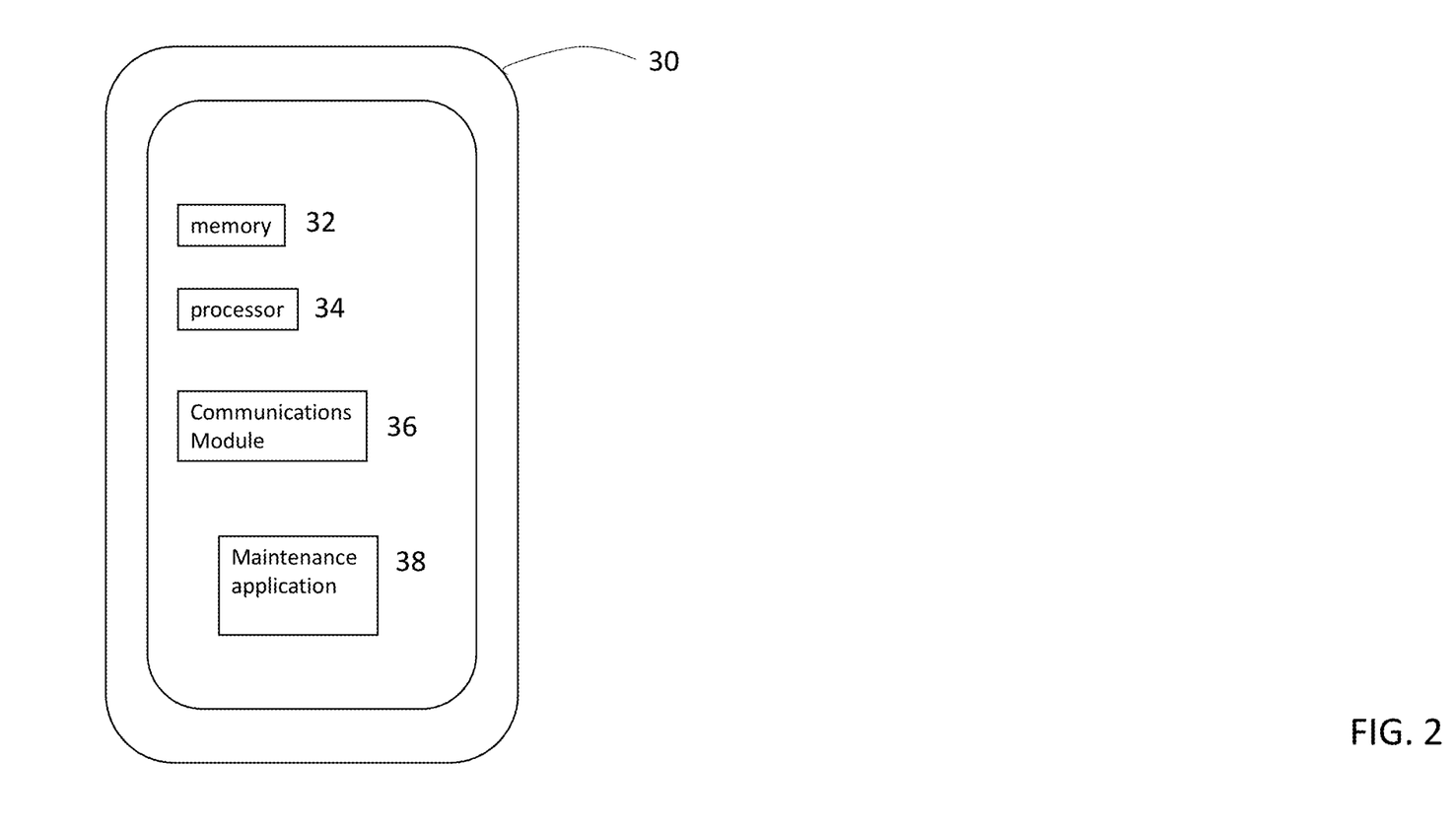
FIG. 2 depicts a mobile device in an embodiment.

Also shown in FIG. 1 is a mobile device 30. The mobile device 30 may comprise a device that is typically carried by a person, such as a phone, PDA, electronic wearable, RFID tag, laptop, tablet, watch, or any other known portable mobile device. In one embodiment, the mobile device may be a fixed computer terminal. The mobile device 30 may include a processor 32, a memory 34, and a communication module 36 as shown in FIG. 2. The processor 32 can be any type or combination of computer processors, such as a microprocessor, microcontroller, digital signal processor, application specific integrated circuit, programmable logic device, and/or field programmable gate array. The memory 34 is an example of a non-transitory computer readable storage medium tangibly embodied in the mobile device 30 including executable instructions stored therein, for instance, as firmware. The communication module 36 may implement one or more communication protocols as described in further detail herein. The mobile device 30 executes a maintenance application 38, which may be implemented by software stored in memory 34 having instructions executed by processors 32. The use of the maintenance application 38 is described in further detail herein. In one embodiment, the maintenance application may be a web-based portal that the mechanic can log into.

The mobile device 30 and the conveyance system controller 20 communicate with one another through any known communication means. According to one or more embodiments, the communication between the mobile device 30 and the conveyance system controller 20 is done through systems such as transmitters, converters, receivers, and other transmitting and processing elements depending on the communication type selected. For example, the mobile device 30 and the conveyance system controller 20 may communicate with one another when proximate to one another (e.g., within a threshold distance). The mobile device 30 and the conveyance system controller 20 may communicate over a wireless network, such as 802.11x (WiFi), short-range radio (Bluetooth), or any other known type of wireless communication. In some embodiments, the conveyance system controller 20 may include, or be associated with (e.g., communicatively coupled to) a networked element, such as kiosk, beacon, hall call fixture, lantern, bridge, router, network node, etc. The networked element may communicate with the mobile device 30 using one or more communication protocols or standards. For example, the networked element may communicate with the mobile device 30 using near field communications (NFC), or any type of known wired or wireless communication means. In one embodiment, the mobile device 30 and the conveyance system controller 20 may communicate over a cellular network, satellite network, or the internet.

Figure 3:
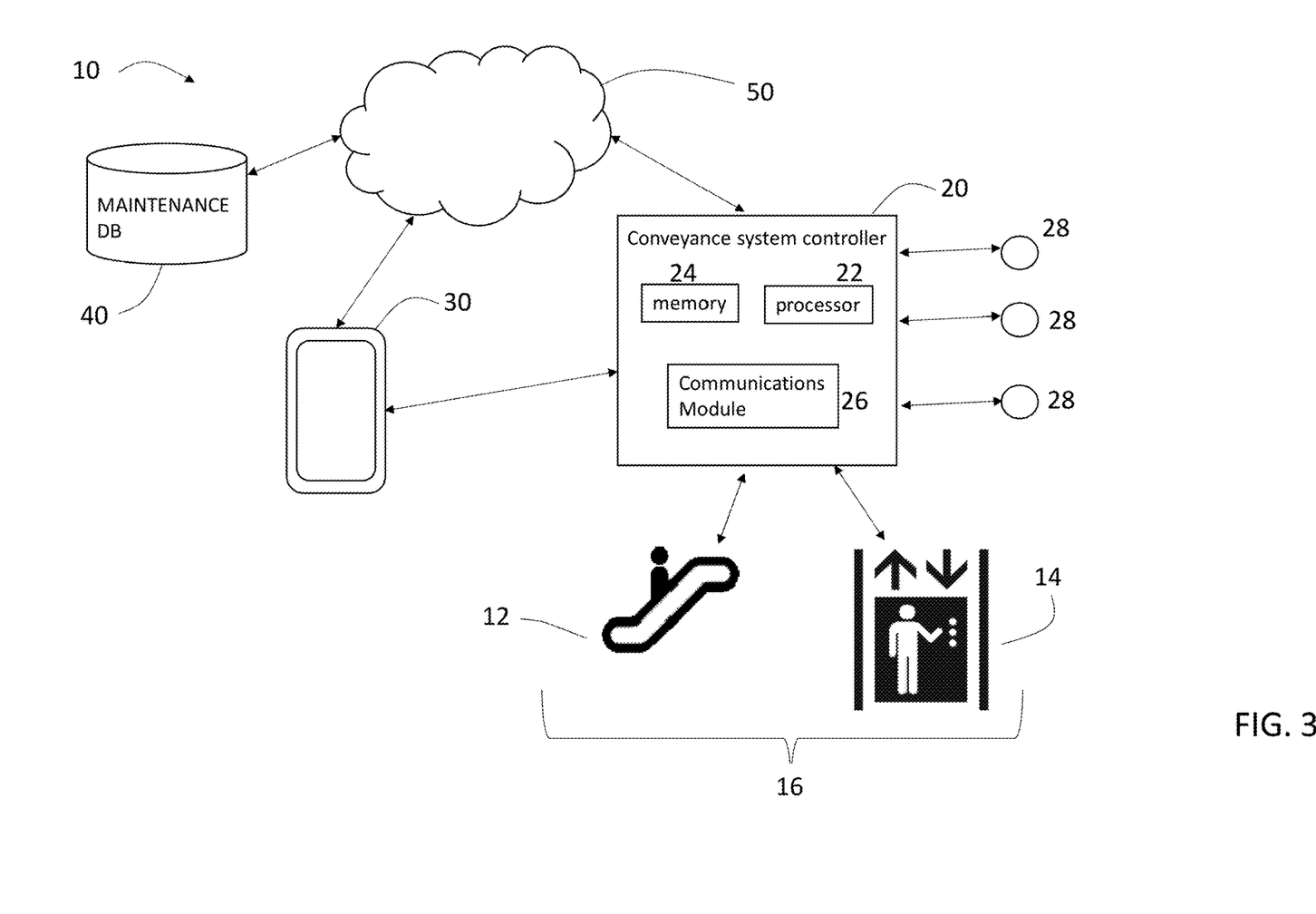
FIG. 3 depicts a system for automating conveyance system maintenance in an embodiment.

FIG. 3 depicts a system 10 for automating conveyance system maintenance in another embodiment. The system of FIG. 3 is similar to that of FIG. 1, but the maintenance database 40 is accessible via a network 50. The maintenance database 40 may be hosted on a remote device (e.g., a server or cloud computing architecture) or other known system. The network 50 may be a wired and/or wireless network including a local network, wide area network, global network (e.g., Internet), etc. Both the conveyance system controller 20 and the mobile device 30 can access the maintenance database 40 over network 50. This arrangement allows a user of mobile device 30 to access the maintenance database 40 prior to arriving at a building housing the conveyance system controller 20 to view the maintenance tasks and the current maintenance task status.

Figure 4:
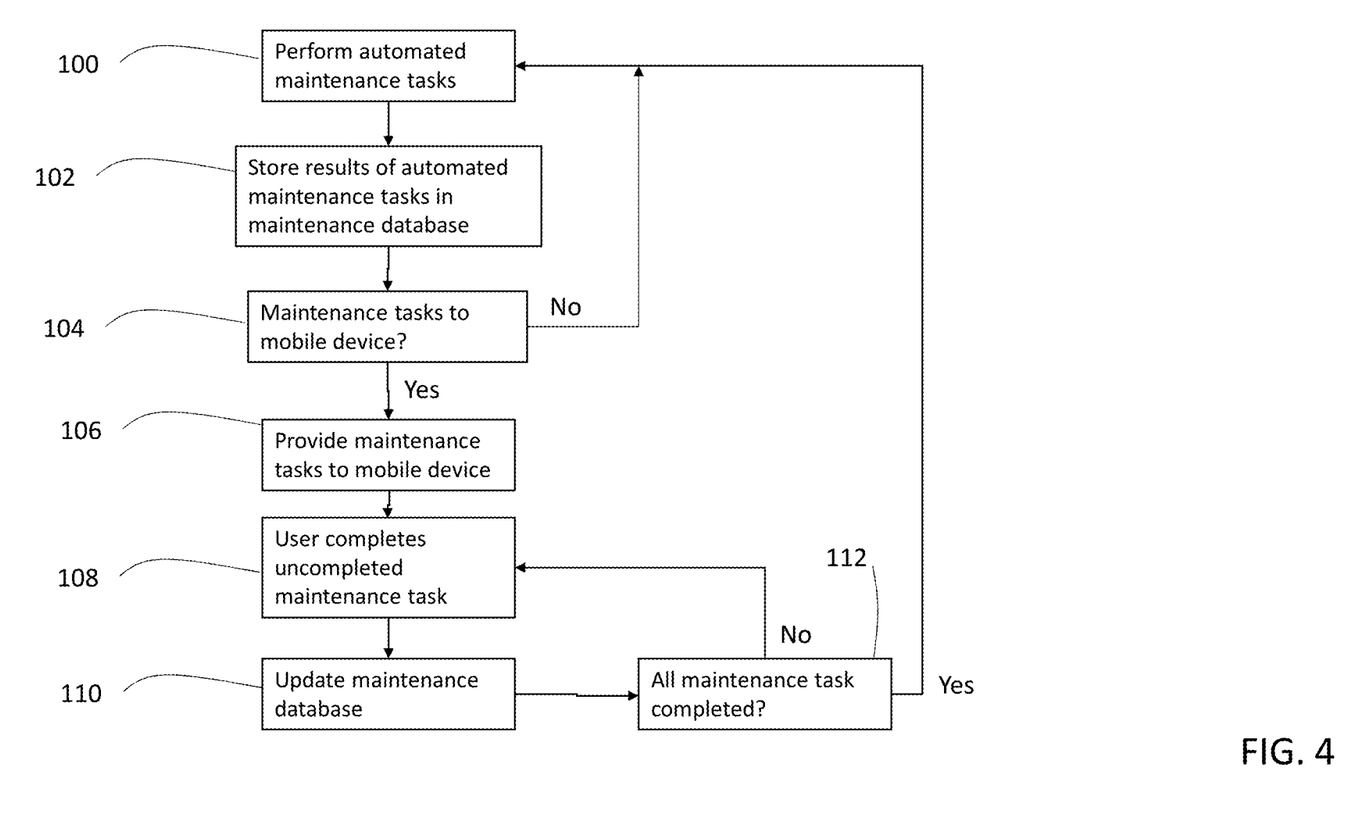
FIG. 4 is a flowchart of a process for automating conveyance system maintenance in an embodiment.

FIG. 4 is a flowchart of a process for automating conveyance system maintenance in an embodiment. The process begins at 100 where automated maintenance tasks for the conveyance system 16 are performed under the instruction of the conveyance system controller 20. Each automated maintenance task may be designed to fulfill a specific task in a maintenance routine for a given country, code area or equipment type. These automated maintenance tasks can be performed by using a variety of data including, but not limited to, existing system and sensor data, data from sensors added specifically for automating maintenance or images/video from cameras. Video analytics may be used to determine if there is a need to perform one or more automated maintenance tasks. The system performs the automated maintenance tasks between maintenance visits and stores and aggregates the results in the maintenance database 40.

There are a variety of automated maintenance tasks that may be executed by the conveyance system controller 20. Automated maintenance tasks may include continuous maintenance tasks. Continuous maintenance tasks may be performed for every operation of the conveyance system 16, such as on every elevator run, brake lift or door cycle, or on continuous escalator operation. An example of continuous maintenance tasks is checking the landing accuracy at the end of every elevator run. The conveyance system controller 20 collects and aggregates the compliance data to the required code and manufacturer service standards for each landing. Results will specify for each landing, what percentage of the runs since the last maintenance visit complied with manufacture service standards and code required standards. This continuous maintenance tasks would replace a mechanic running the elevator to every landing to check the landing accuracy performance. For the task to be checked as automatically performed and completed, 100% of the runs would need to fall into the specified standard. The mechanic now has a view of the compliance since the last maintenance visit instead of just for the day that the mechanic is in the building. Another example is checking the conveyance system machine for noise and vibration within allowed thresholds on every run for an elevator, or continuously for an escalator. The noise and vibration would have to be within the thresholds for all runs to specify that the task was automatically performed.

The automated maintenance tasks may include scheduled maintenance tasks. These scheduled maintenance tasks are tests that run a set procedure to verify the maintenance task. These scheduled maintenance tasks could be run at a configurable rate such as hourly, daily or weekly. An example of scheduled maintenance tasks includes running a brake test every night when an elevator is idle. For the scheduled maintenance tasks to be checked as automatically performed and completed, every test run would have to pass the required test. Another example would be to test the elevator cab emergency lights daily or weekly by turning off the normal cab lighting, turning on the emergency lighting, and checking for the code required illumination. Every test would have to pass to specify that the task was automatically performed.

The automated maintenance tasks may include event-driven maintenance tasks based data collection. Event-driven maintenance tasks are tests that monitor for specific events and use sensed data from sensors 28 to automatically determine the health of a conveyance system component. An example would be checking elevator button transitions as evidence of health of a particular button. Another example would be to check for the existence or absence of existing logged events for evidence of health.

Example automated maintenance tasks also include checking that the buttons in the hall or inside the elevator cab function correctly, checking that all lights and lamps inside the elevator cab are functioning, checking that the machine bearing is not making noise, checking that the position indicator inside the cab is working correctly, checking load weighing accuracy, checking that the elevator door reversal devices are functioning correctly, checking the elevator landing accuracy at every landing, checking elevator ride quality specification, checking elevator door operation and checking cleanliness of elevator pits, elevator machine rooms, or escalator control spaces. Embodiments are not limited to the automated maintenance tasks described herein.

Referring to FIG. 4, as the conveyance system controller 20 performs the automated maintenance tasks at 100, the results of the automated maintenance tasks are stored in the maintenance database 40 at 102. The results may include an automated maintenance task identifier, date/time of execution, measured value, reference value and maintenance task status (completed or uncompleted). If a condition is detected that requires more immediate attention, the system may automatically notify the mobile device 30 of such a condition and a corresponding maintenance task to address the condition.

At 104, the system determines if maintenance tasks are to be provided to the mobile device 30. This may occur in a variety of ways. In one embodiment, the user sends a request from the mobile device 30 to access the maintenance database 40. In other embodiments, the maintenance tasks are automatically be pushed via a push operation to the mobile device 30. In other embodiments, a maintenance calendar (or other maintenance scheduling system) automatically pulls the maintenance tasks to the mobile device 30 in response to a maintenance calendar event. If there is no need to send maintenance tasks to the mobile device 30, the system 10 continues to execute the automated maintenance tasks and update the maintenance database 40 at 100 and 102.

If at 104 a condition necessitates providing maintenance tasks to the mobile device 30, flow proceeds to 106 where maintenance tasks are provided to the mobile device 30. The mobile device 30 may access the maintenance database 40 through conveyance system controller 20 (FIG. 1) or though the maintenance database 40 directly over network 50 (FIG. 3). The mobile device 30 or the conveyance system controller 20 maps the automated maintenance checks to currently scheduled maintenance tasks for the conveyance system. This mapping may be based on simple logic or complex analytics (such as video analytics). The algorithms and analytics may be done locally on the user device 30 or the data may be transmitted to remote servers or cloud computing platform and the results transmitted back to the mobile device 30. The maintenance task list may specify maintenance tasks that were automatically performed and completed, maintenance tasks that were automatically performed and are uncompleted, and manual maintenance tasks that are not automated and must be performed manually by the user. The user can review the results of all the automated tests performed by the system.

Figure 5:
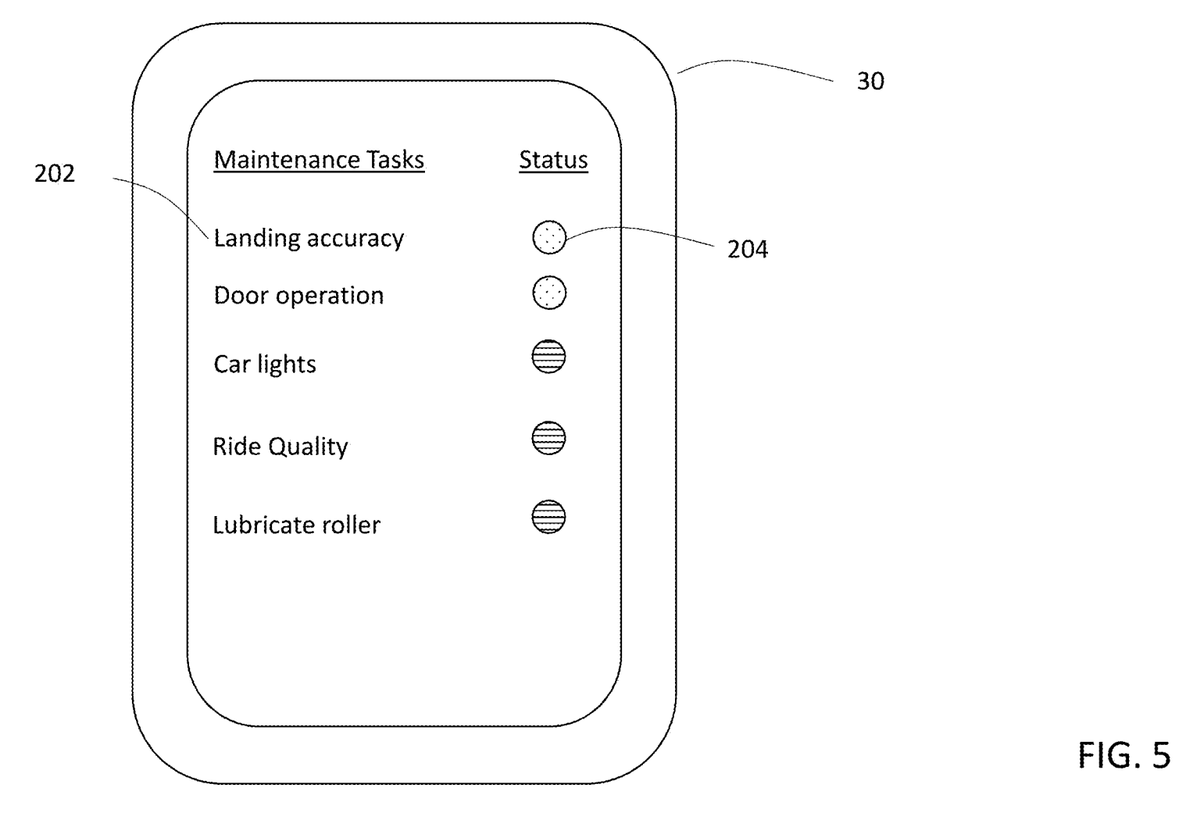
FIG. 5 depicts a user interface on a mobile device in an embodiment.

FIG. 5 depicts an exemplary user interface on the mobile device 30. The user interface presents maintenance tasks with a descriptor 202 and a status indicator 204. The status indicator 204 indicates whether the maintenance task has been completed or is uncompleted. For example, the status indicator 204 may be green if a maintenance task is completed and may be red if the maintenance task is uncompleted. Uncompleted maintenance tasks require some action by the user to complete the maintenance task. The user can select an uncompleted maintenance task identifier 202 to obtain instructions on how to complete the uncompleted maintenance task. The user can also select a completed maintenance task identifier 202 to view the results (e.g., measured values) from an automated maintenance task.

Referring back to FIG. 4, at 108 the user completes maintenance tasks identified as uncompleted. As the user completes each maintenance task, flow proceeds to 110 where the mobile device 30 transmits an indication of completion of the maintenance task. The user may mark the task as complete on the mobile device 30 via a user input. The maintenance database 40 is updated by one of the remote device via network 50 or by the conveyance system controller 20. Any measured values obtained in completing the maintenance task may be uploaded for storage on the maintenance database 40. Some maintenance tasks will simply require an entry that the task was completed (e.g., lubricate door roller).

At 112, it is determined if all the uncompleted maintenance tasks have been completed. If not, flow returns to 108 where the user continues to work on completing any uncompleted maintenance tasks. Once all the maintenance tasks are completed at 112, flow proceeds back to 100.

Embodiments provide for improved quality of maintenance. Automated checks can provide a summary of the performance since the last user visit, instead of a check just on the day the user visits the unit. Embodiments provide maintenance task consistency across mechanics, regions and countries. Embodiments provide the ability to automatically check for the required criteria based on the equipment type or applicable code area. Embodiments provide the ability to prioritize the maintenance tasks that the mechanic performs on a unit. Embodiments provide improved safety to elevator mechanic by eliminating the need for the mechanic to enter potentially dangerous areas (e.g., elevator pit, hoistway, etc.). Embodiments provide increased mechanic efficiency, as the user (e.g., mechanic) does not have to perform maintenance tasks automatically verified by the system. The user may focus on maintenance tasks that require attention.

Although embodiments described above have been described with reference to conveyance systems, it is understood that embodiments may be applied to other type of building equipment that is configurable for automated test by a controller. For example, a HVAC controller could provide automated testing of components of an HVAC system and provide maintenance tasks to a user in accordance with embodiments described herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

The present embodiments may be a system, a method, and/or a computer program product at any possible technical detail level of integration. The computer program product may include a computer readable storage medium (or media)

having computer readable program instructions thereon for causing a processor to carry out aspects of the present disclosure.

The computer readable program instructions may execute entirely on the mobile device, partly on the mobile device, as a stand-alone software package, partly on the mobile device and partly on a remote computer or entirely on the remote computer or server. In the latter scenario, the remote computer may be connected to the mobile device through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. A method for automating maintenance of a conveyance system, the method comprising:
  receiving video from a camera associated with the conveyance system;
  performing automated maintenance tasks on the conveyance system;
  storing results of the automated maintenance tasks in a maintenance database; and
  providing maintenance tasks to a mobile device, each maintenance task including a maintenance task identifier and a maintenance task status;
  wherein the performing the automated maintenance tasks comprises performing video analytics on the video and performing the automated maintenance tasks in response to the video analytics;
  wherein the automated maintenance tasks are performed under the instruction of a controller, each automated maintenance task fulfilling a task in a maintenance routine.

2. The method of claim 1 further comprising:
  receiving from the mobile device an indication of completion of a maintenance task; and
  updating the maintenance database to include completion of the maintenance task.

3. The method of claim 1 wherein:
  the maintenance task identifier includes automated maintenance tasks and manual maintenance tasks.

4. The method of claim 3 wherein:
  the maintenance tasks status includes completed and uncompleted.

5. The method of claim 1 wherein:
  the maintenance tasks provided to the mobile device include at least one of maintenance tasks required by local regulations and maintenance tasks specified by the conveyance system manufacturer.

6. The method of claim 1 further comprising:
  receiving sensor data from one or more sensors associated with the conveyance system;
  wherein the maintenance tasks provided to the mobile device include event-driven maintenance tasks derived from the sensor data.

7. The method of claim 1 wherein:
  the maintenance task status provides a graphical indication of whether a maintenance task is completed or uncompleted.

8. The method of claim 1 wherein:
  the maintenance tasks are provided to the mobile device by a conveyance system controller or by a remote device hosting the maintenance database.

9. The method of claim 1 wherein:
  the providing the maintenance tasks to the mobile device is in response to at least one of a request from the mobile device, a push operation to the mobile device or a maintenance calendar event.

10. The method of claim 1 wherein:
  the providing the maintenance tasks to the mobile device is in response to a condition detected in the conveyance system.

11. The method of claim 1 wherein:
  the performing the automated maintenance tasks comprises performing the automated maintenance tasks periodically.

12. The method of claim 1 wherein:
  the performing the automated maintenance tasks comprises collecting and aggregating data from the conveyance system and performing the automated maintenance tasks in response to the data.

13. A computer program product for a mobile device, the computer program product comprising a computer readable storage medium having program instructions embodied therewith, the program instructions executable by a processor to cause the processor to implement operations comprising:
  receiving video from a camera associated with the conveyance system;
  establishing a connection with a maintenance database, the maintenance database storing results of automated maintenance tasks for a conveyance system;

receiving maintenance tasks from the maintenance database, each maintenance task including a maintenance task identifier and a maintenance task status;

upon completion of a maintenance task, transmitting completion of the maintenance task to update the maintenance database to indicate completion of the maintenance task;

wherein the performing the automated maintenance tasks comprises performing video analytics on the video and performing the automated maintenance tasks in response to the video analytics;

wherein the automated maintenance tasks are performed under the instruction of a controller, each automated maintenance task fulfilling a task in a maintenance routine.

14. The computer program product of claim 13 wherein:
the maintenance task identifier includes automated maintenance tasks and manual maintenance tasks.

15. The computer program product of claim 14 wherein:
the maintenance tasks status includes completed and uncompleted.

16. The computer program product of claim 13 wherein:
the maintenance tasks provided to the mobile device include at least one of maintenance tasks required by local regulations and maintenance tasks specified by the conveyance system manufacturer.

17. The computer program product of claim 13 wherein:
the maintenance tasks include event-driven maintenance tasks derived from sensor data.

18. The computer program product of claim 13 wherein:
the maintenance task status provides a graphical indication of whether a maintenance task is completed or uncompleted.

19. The computer program product of claim 13 wherein:
the maintenance tasks are received from a conveyance system controller or a remote device hosting the maintenance database.

20. A method for automating maintenance of a conveyance system, the method comprising:
receiving video from a camera associated with the conveyance system;

performing automated maintenance tasks on the conveyance system, wherein the performing the automated maintenance tasks comprises performing video analytics on the video and performing the automated maintenance tasks in response to the video analytics, wherein the automated maintenance tasks are performed under the instruction of a controller, each automated maintenance task fulfilling a task in a maintenance routine wherein the performing the automated maintenance tasks comprises collecting and aggregating data from the conveyance system and performing the automated maintenance tasks in response to the data;

storing results of the automated maintenance tasks in a maintenance database;

providing maintenance tasks to a mobile device, each maintenance task including a maintenance task identifier and a maintenance task status;

receiving from the mobile device an indication of completion of a maintenance task;

updating the maintenance database to include completion of the maintenance task;

receiving sensor data from one or more sensors associated with the conveyance system;

wherein the maintenance tasks provided to the mobile device include event-driven maintenance tasks derived from the sensor data.

* * * * *